United States Patent [19]

Kinder et al.

[11] 4,235,607
[45] Nov. 25, 1980

[54] METHOD AND APPARATUS FOR THE SELECTIVE ABSORPTION OF GASES

[75] Inventors: Richard A. Kinder; Fred T. Sherk, both of Bartlesville, Okla.

[73] Assignee: Phillips Petroleum Company, Bartlesville, Okla.

[21] Appl. No.: 4,796

[22] Filed: Jan. 19, 1979

[51] Int. Cl.³ .............................................. B01D 19/00
[52] U.S. Cl. ......................................... 55/68; 55/222; 55/73; 261/21; 261/77; 166/357; 166/267
[58] Field of Search ................... 55/68, 73, 41, 43, 49, 55/53, 222, 257 R; 261/77, 22, 114 R, 21; 166/267, 357

[56] References Cited

U.S. PATENT DOCUMENTS

| | | | |
|---|---|---|---|
| 1,525,060 | 2/1925 | Bertsch | 55/257 R |
| 2,039,330 | 5/1936 | McKee | 166/267 |
| 2,104,327 | 1/1938 | Kotzehoe | 166/267 |
| 2,345,667 | 4/1944 | Hachmuth | 261/114 R |
| 3,027,320 | 3/1962 | Buchanan | 210/59 |
| 3,097,917 | 7/1963 | Dotts | 23/2 |
| 3,129,076 | 4/1964 | De Smet | 261/77 |
| 3,242,646 | 3/1966 | Miller et al. | 55/68 |
| 3,690,040 | 9/1972 | Halfon | 55/46 |
| 3,722,179 | 3/1973 | Moen et al. | 55/68 |
| 3,864,439 | 2/1975 | Tanigawa et al. | 261/114 R |
| 3,885,624 | 5/1975 | Brown | 166/57 |

FOREIGN PATENT DOCUMENTS 236622 6/1929 United Kingdom ................ 55/73

*Primary Examiner*—Bernard Nozick

[57] ABSTRACT

A process and apparatus for removing an impurity from a gas by means of selective absorption of a gas impurity by a suitable absorbent. The absorbent and gas are contacted in a contacting zone which is divided into a plurality of compartments with the absorbent and gas flowing cocurrently in each individual compartment. The overall system, however, is a countercurrent flow system wherein the absorbent flows downwardly and the gas flows upwardly. The process and the apparatus can be used for the removal of carbon dioxide from natural gas with the use of salt water as the absorbent. The invention is especially useful for a natural gas well located in offshore waters that produces a gas with a high concentration of carbon dioxide as the apparatus can be erected on the ocean floor and use the surrounding sea water as absorbent.

13 Claims, 3 Drawing Figures

METHOD AND APPARATUS FOR THE SELECTIVE ABSORPTION OF GASES

BACKGROUND OF THE INVENTION

This invention relates to a method and apparatus for treating a gaseous mixture in order to change the concentration of a component thereof. In another aspect, this invention relates to the selective absorption of an undesirable component of a gaseous mixture. In another aspect, this invention relates to an apparatus used for treating a gaseous mixture. In yet another aspect, this invention relates to the removal of carbon dioxide from a gas. Still another aspect of the present invention is the removal of carbon dioxide from a gas using salt water as the absorbent. Another aspect of the present invention is the removal of carbon dioxide from carbon dioxide-containing natural gas. In yet another aspect, this invention relates to the removal of carbon dioxide from natural gas which has a high concentration of carbon dioxide. In still another aspect, this invention relates to the treatment of natural gas obtained from an offshore well wherein the contacting zone is erected on the ocean floor and sea water is used to absorb carbon dioxide.

The volume of natural and industrial gases treated for various purposes is continually increasing. Efficient and effective methods of treating gases, therefore, are very important to industry. The need for efficient and economical methods of treatment is especially important in the natural gas industry where the percentage of gas produced which requires treating will continue to increase as uncontaminated gas reserves are depleted.

One of the most common impurities found in natural gas is carbon dioxide. In many areas of the world, natural gas, predominantly methane, is found associated with major amounts of carbon dioxide. When the carbon dioxide content exceeds about 10 volume percent, especially about 20 volume percent or greater, its removal by conventional means, such as amine absorption, becomes uneconomical due to the high energy requirements of the amine process and the excessive size of the equipment necessary to remove such a large amount of $CO_2$. A problem also exists in the handling of the large volume of removed $CO_2$ unless a special situation exists where there is a worthwhile use for large amounts of carbon dioxide such as in flooding reservoirs for secondary or tertiary oil recovery. Also, it may be economical to use the gas as it is produced as a low heating value fuel if a suitably large demand for fuel gas for power generation or industrial purposes exists within a reasonable distance from the production site. Unfortunately, however, many of these gas reservoirs are in remote areas where no major demand for fuel exists, where carbon dioxide has no value and where construction of gas processing facilitates is expensive. The cost of transporting the gas can be reduced, therefore, if the $CO_2$ could be removed at the well, especially if the $CO_2$ is present in a very high concentration.

Accordingly, it is an object of this invention to provide a method which enables more economical and convenient treating of gaseous mixtures.

Another object of the present invention is to provide an apparatus to be used in the treatment of gaseous mixtures.

Another object of the present invention, is to provide a simple process for treating natural gas obtained from offshore wells.

Another object is to provide an economical means for treating natural gas obtained from an offshore well.

Another object of the present invention is to save on cost of transporting gas from a well in a remote area, e.g., such as an offshore well 200 miles from land.

Other objects, aspects, and the several advantages of this invention will be apparent to those skilled in the art upon a study of this disclosure, the appended claims and the drawings.

SUMMARY OF THE INVENTION

The present invention is concerned with a process for treating a gaseous mixture in order to change the concentration, i.e., remove a component thereof. The impurity is removed through selective absorption. The gas and absorbent are contacted in a novel contacting device which allows multiple-stage cocurrent contacting in an overall countercurrent system.

The invention is especially applicable to any carbon dioxide-containing gas, but is particularly useful when the carbon dioxide concentration is 10 volume percent or more. When the system is used for the removal of carbon dioxide from a gas, salt water, e.g., sea water, can be used as the absorbent.

In one preferred embodiment of the present invention, the process and apparatus of the invention are used for the removal of carbon dioxide from natural gas. The process is particularly economical when the carbon dioxide concentration is 10–20 volume percent or more of the natural gas. With the use of sea water as the absorbent for the carbon dioxide, the invention finds great applicability in the treatment of a gaseous mixture of carbon dioxide and natural gas wherein the natural gas well is in a remote area with sea water available. The invention would be of particular importance in treating natural gas with a high concentration of carbon dioxide obtained from an offshore well.

In specific embodiments of the present invention, therefore, the instant invention relates to a novel and simple process for the removal of large amounts of carbon dioxide from natural gas when sea water is available, particularly when the producing formation is located in offshore waters. The process employs a novel contacting device which allows multiple-stage cocurrent contacting in an overall countercurrent system without the use of pumps other than an optional low head pump on the incoming sea water which serves as a carbon dioxide absorbent for the process.

The contacting device comprises a unit which is closed at each end with a plurality of compartments within said unit. The contacting device also comprises passage means to allow absorbent to flow from the upper portion of one compartment to the lower portion of the next, successive compartment. Absorbent and gas flow cocurrently in the compartments with absorbent being passed from one compartment to the next via the passage means.

In one preferred embodiment, the contacting device comprises a tube which is divided into a series of compartments and is located inside a larger outer shell which is closed at each end. Each compartment of the tube constitutes an absorber stage with a gas-dispersing means in the lower portion of the compartment to allow the gas from the compartment below to enter said compartment and be dispersed therein.

DETAILED DESCRIPTION OF THE INVENTION

Figure 1:
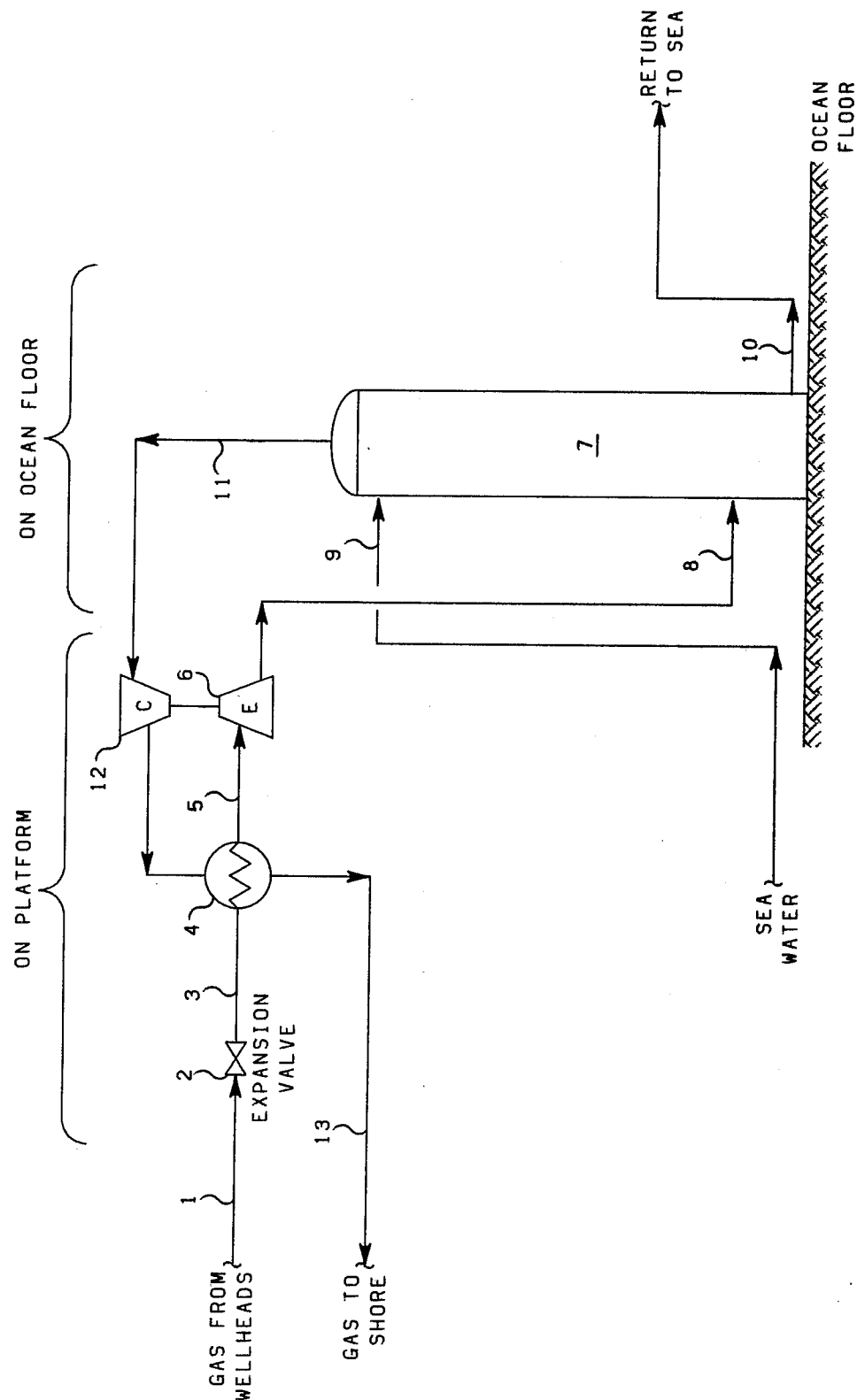
FIG. 1 is a schematic of one specific embodiment of the invention wherein carbon dioxide is absorbed from natural gas obtained from an offshore well.

Treatment of a gaseous mixture by an absorbent in order to remove an undesirable component thereof is well known in the art. The process of the present invention, however, utilizes a contacting device which allows multiple-stage cocurrent contacting in an overall countercurrent system.

The contacting device comprises a unit which is closed at each end and contains a plurality of compartments. Passage means, e.g., piping, tubing, an annulus between two structures, etc., allow absorbent to flow successively from one compartment to the next. The arrangement of compartments is preferably in a straight vertical arrangement with a staggered arrangement possible as long as the flow from compartment to compartment is countercurrent to the flow of gas through the system and there is free access for the overflowing absorbent to move down to the next stage. The flow of the absorbent within each compartment, however, is cocurrent with the gas. The gas is collected in the upper portion of each compartment and then passed via a conduit means to a dispersing means in the lower portion of the next absorber stage or compartment. The gas is thereby dispersed within the absorbent and flows toward the top of the compartment where it separates from the absorbent with the absorbent then being passed via a passage means to its next, successive stage where it contacts a gas containing more impurities than in the previous stage.

In one preferred embodiment, the contacting device is basically a column that comprises a tube, e.g., a draft tube, that is located inside a larger outer shell which is closed at each end. The location of the tube within the outer shell is not of great importance. The tube is preferably located concentrically; however, the tube can be off-center or even abut a portion of the inner wall of the outer shell. The shape of the tube is also of little importance and can be of any desirable shape, e.g., circular, rectangular, pentagonal, etc. The circular shape of the tube is the preferred shape. The tube itself, which is really a draft tube, is divided into a series of compartments. Each compartment provides an absorber stage for gas-absorber contacting in which the gas from the stage below is dispersed through a suitable dispersing means into the lower portion of the compartment or absorber stage. The dispersing means can be any suitable device such as a sparger.

Absorbent from the absorber stage above flows downwardly through a passage means to enter the lower absorber stage at a point below the dispersing device. The passage means can be any type of conduit means, such as piping or tubing, or can be an annulus between two structures, such as between the tube and outer shell or the tube and a containing wall attached thereto. When the tube is concentrically located, the absorbent can flow downwardly through the annulus between the draft tube and the outer shell and then enter the absorber stage at a point below the dispersing device. The absorber and the gas dispersed into the absorbent then flow cocurrently upward through the absorber stage. Gas accumulates at the top of the absorber stage, which can be called the disengaging zone, and then passes via a conduit to the dispersing means or sparger in the absorber stage above. Absorbent, richer in the dissolved, undesirable component, flows from the disengaging zone into the passage means, e.g., the annular zone between the tube and outer shell when the tube is located concentrically, and thence downwardly to the stage below. Partitions can be placed in the annular space in order to direct the absorbent flow through the absorber stages in the desired manner.

Horizontal partitions or baffles can be used to prevent the absorbent from flowing past the compartment located immediately below thereby insuring all of the absorbent enters said lower compartment. Vertical partitions or baffles can also be used to insure that all of the absorbent enters or flows to the compartment located immediately below as opposed to flowing around the tube to another passage means and thereby flowing to a still lower compartment.

The system operates on the same principle as an airlift pump. The mixture of gas and liquid absorbent in each absorber stage of the draft tube is less dense than the liquid in the passage region. This difference in density allows the liquid to circulate through the draft tube cocurrently in the absorber stages and countercurrently in the passage regions without the use of pumps.

The process and apparatus can be employed for the treatment and removal of components or impurities from any suitable gas that contains components which are to be removed and are more soluble in the solvent than the other components of the gas. Natural gas, nitrogen, hydrogen, and many other synthesis, refinery, and manufactured gases can be treated by the process in order to remove impurities such as carbon dioxide, hydrogen sulfide, carbon monoxide, sulfur dioxide, and ammonia, to name a few. The type of absorbent used and the conditions of the treatment will vary, however, with the particular gases treated and particular impurities one wishes to remove. For example, the invention can be used to remove water-soluble gases from gases insoluble in water by using water as the absorbent. When a particular component of the gas is chosen as the component to be removed, an appropiate absorbent is chosen which has an affinity for the component but in which the other components are insoluble.

The process and apparatus are particularly useful for the treatment of a carbon dioxide-containing gas for the removal of carbon dioxide. The invention is applicable to any carbon dioxide-containing gas, but will be particularly economical when the $CO_2$ concentration is about 10 volume percent, preferably 20 volume percent, or more.

The use of salt water, e.g., sea water, can be used most economically and efficiently as the absorbent for carbon dioxide from a carbon dioxide-containing gas. Although other appropriate absorbents can be used, the particular type of absorbent used will ultimately be determined by the gas, which must be less soluble than the $CO_2$ in the absorbent, in admixture with the carbon dioxide.

The invention has been found to be particularly useful in the removal of carbon dioxide from natural gas, especially when the natural gas field is in a remote area and the $CO_2$ concentration is 10-20 volume percent or more of the gas mixture. The removal of the carbon dioxide, when it is in such high concentrations, at the well will help reduce the cost of transporting the gas from the remote area to a place of use or storage. The invention, therefore, finds great applicability to the treatment of natural gas obtained from a gas well located at sea, e.g., 200 miles from land, as the pumping of the gas to land for processing will be a great expense and the removal of carbon dioxide, which can be about 70 mole percent of the gas mixture, will help to reduce the cost of transporting the gas to shore.

The invention does not require that the apparatus be used at sea, but can be also used in fresh or brackish water areas as long as the apparatus can be completely submerged. In shallow water areas, a hole can be dug in the bottom of the reservoir in order to completely submerge the column.

The invention is also applicable to use in a large pool or tank of solvent or absorbent in which the contacting device is completely submerged. Once the absorbent is introduced into the device and gas is introduced into the bottom of the device, the hydraulic lift is sufficient so that no other pumps are needed to effect the multistage cocurrent-countercurrent contacting.

One preferred embodiment of this invention, however, is the use of the process and apparatus to treat natural gas obtained from an offshore well at sea for the removal of carbon dioxide using the sea water as an absorbent. The $CO_2$ removal is accomplished by erecting the multistage cocurrent absorption towers on the ocean floor and using the surrounding sea water as the absorbent. The location on the ocean floor is not essential. As long as the column is completely submerged, it can be suspended or supported or can even rest in a hole of sufficient size bored into the bottom of the water reservoir.

The system used in this manner produces many advantages in that no absorbent pumping equipment is needed and that the absorption is improved by the high pressures near the ocean floor. An additional advantage would be that the removed $CO_2$ is discharged as a solution to the sea in relatively deep water where it remains until ocean currents and diffusion disperse it.

Other advantages of the apparatus and system in general include simple construction. The internals can be assembled and slid into the outer shell before the head is installed. Very little machine work is required. Also, since the unit operates at near the same pressure as the surrounding medium (submerged in the absorbent, e.g., sea water), heavy walled construction is not required. The energy for the operation is also supplied by the gas being treated, thereby resulting in only a small pressure drop (e.g., 10-20 psi) on the gas. As to the number of stages that can be used, any number of stages can be used within limits of the available surrounding fluid depth.

A better understanding of the invention will be obtained upon reference to the following drawings and illustrative example. The drawings and illustrative example are used as a detailed description of one preferred embodiment of the invention but is not meant to be limited thereto.

A schematic of the proposed process of the preferred embodiment is shown in FIG. 1. Gas from the wellhead 1 is first throttled at expansion valve 2 to a lower pressure. The expanded gas is then passed via conduit 3 to heat exchanger 4 where it is heated. The heated gas is then passed via conduit 5 to expansion engine 6 where it is expanded in such a manner that it exists at the desired conditions for entering the contacting zone or treatment zone 7 on the ocean floor. The expanded gas enters the contactor at the lower portion 8 of the contactor whereas the absorbent, sea water, enters a contactor in the upper portion 9. A $CO_2$-enriched sea water is returned to the sea via 10 whereas the $CH_4$-rich gas leaving the contactor via 11 is recompressed by compressor 12 driven by the expansion engine. The purified natural gas, primarily $CH_4$, is then sent to shore via exchanger 4 and line 13. The heat exchanger 4 provides sufficient heat to the feed to prevent any $CO_2$ in the feed gas from forming dry ice upon subsequent expansion in engine 6.

The carbon dioxide-rich sea water effluent 10 will be warmed, perhaps as much as 3°-5° F., since heat is released when $CO_2$ is absorbed in water. The effluent is preferably discharged, therefore, well above the ocean floor to avoid back mixing with the cooler water below. Since the water will begin to release carbon dioxide as the pressure is reduced, the water may be also discharged into a standpipe where the mixed phase flow can develop additional buoyancy head as the carbon dioxide is released.

Feed water temperature, which enters at 9, is desirable as cold as is available due to the fact that $CO_2$ solubility decreases with rising water temperature. Therefore, water nearest the ocean floor is used in the top stage as feed water and will generally be in the range of 28° to 70° F. (2° to +19° C.).

As will be recognized by one skilled in the art, it is important in expanding the incoming gas to avoid conditions of temperature and pressure which could lead to the formation of gas hydrates of solid carbon dioxide. If moisture is present in the gas, hydrates can form at temperatures as high as about 80° F. (27° C.). In the absence of water, solid carbon dioxide can form at about 70° F. (57° C.).

The operating pressure of the contactor or absorber is generally fixed by the depth of the ocean and the vicinity of the desired plant site since it is preferred to avoid or at least minimize water pumping. Each 100 feet of ocean depth will supply a hydraulic head of about 44-45 psi, depending on ocean temperature. The buoyant head developed in the contacting stages is generally adequate to induce the desired flow of sea water through this system. A pump can be installed on the water feed line if desired, however.

Figure 2:
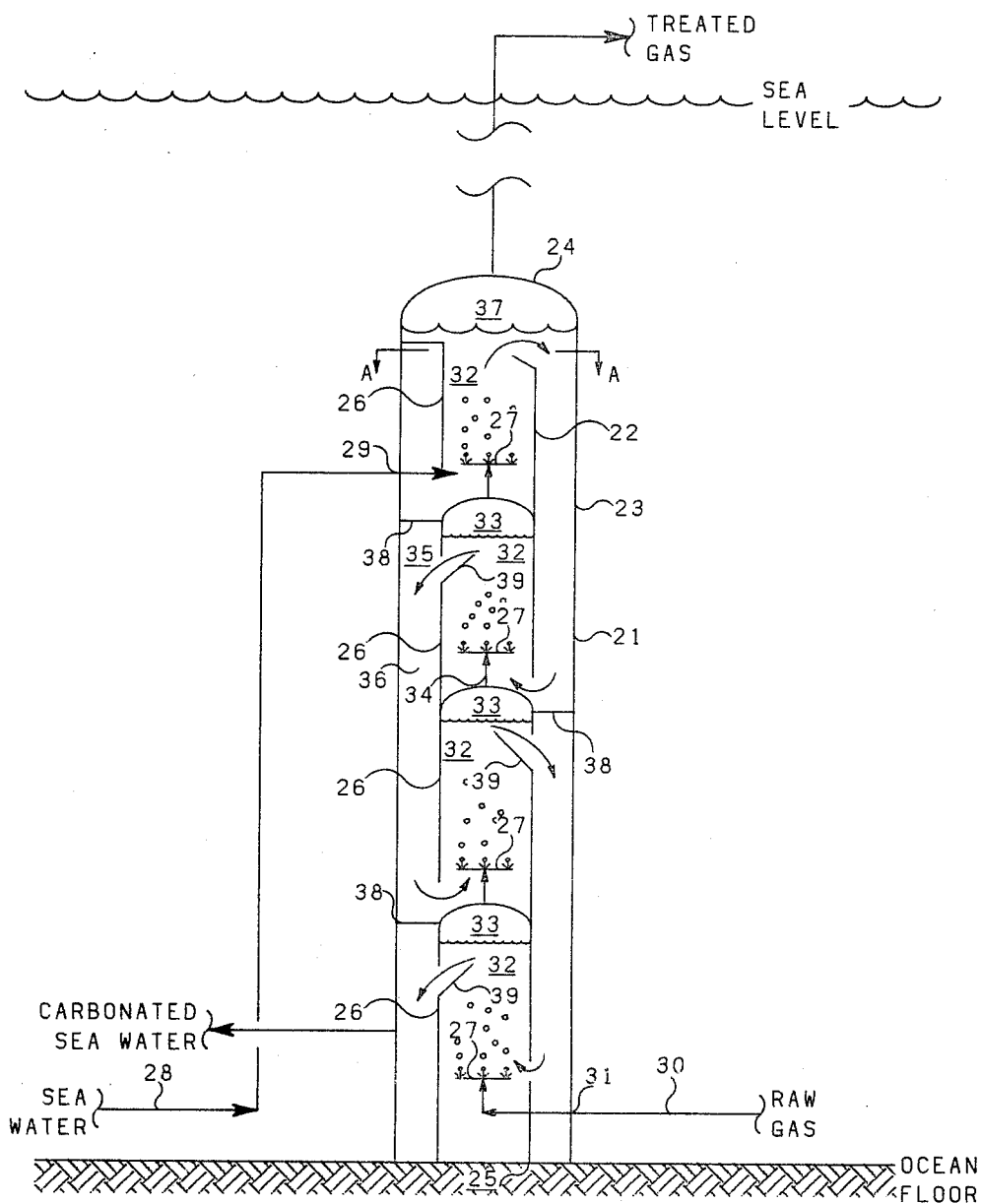
FIG. 2 is a schematic of a four-stage absorber contacting device when used in the specific embodiment of treating offshore natural gas.

Referring now to FIG. 2, a schematic design of a four-stage contactor or absorber 21 is shown as well as the water circulation pattern. Although the number of stages used in the contactor or absorber can vary, it is preferred to use either three or four stages. This is based on the fact that the water requirement for the contactor drops rapidly as more stages are added until the number of stages reach three or four. Further addition of stages does not reduce the water requirement significantly. The amount of methane absorbed in the sea water, however, is reduced by using many stages, as up to 35 percent of the methane absorbed in the top one or two stages is recovered in the lower stages where methane desorption occurs. Therefore, balancing these two considerations, three or four stages would appear to be most economical and efficient.

The contactor of the particular embodiment shown is basically a draft tube 22 located concentrically inside a larger outer shell 23 which is closed at each end 24 and 25. The draft tube 22 is divided into a series of compartments 26, in this case four compartments, each of which provides an absorber stage of gas-sea water contacting in which the gas from the stage below is dispersed through a suitable device such as a sparger 27 into the lower portion of the compartment or stage. The absorbent sea water 28 enters the contactor at the top compartment at a point below the sparger 29. Since cold sea water is a better absorbent for carbon dioxide than warm sea water, water from near the ocean floor where temperatures are generally the lowest is the preferred source of absorbent. One must be careful with respect to the depth from which fresh sea water absorbent is taken, however, with regard to the depth at which the $CO_2$-rich sea water is discharged in order to avoid mixing of the impure sea water with the fresh sea water to be used as absorbent. The raw gas 30 enters the contactor near the bottom 31 and travels upwardly through the various compartments via the dispersing means, i.e., the spargers.

Upon entering the contactor at 29, the sea water and the sparged gas 32 flow cocurrently upward through the top stage. The gas in each individual absorber stage accumulates in a disengaging zone in the top of the stage 33 and passes via a pipe 34 to the sparger above 27. The sea water which has flowed cocurrently to the top of the stage exits through an opening of the compartment 35 and flows countercurrently downward through the annulus 36 between the draft tube and the outer shell and thereby enters the lower stage at a point below the sparger. The top of the weir 39 on each stage is as high as, and preferably somewhat higher than, the top of the exit opening in the inner conduit 26. This is to insure that a liquid seal is maintained at these points so that gas accumulated at the top of the contacting zone, the gas cap, does not enter the annulus area during operation. Gas accumulated at the top of the contacting zone 37 is transported to shore.

Figure 3:
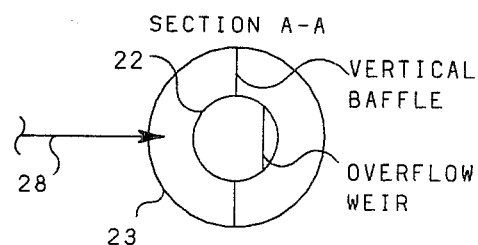
FIG. 3 is a cross-section of the column in FIG. 2 with the addition of vertical partitions.

Partitions 38 in the annular space 36 serve to direct the water flow through the stages in the desired manner. The partitions can be horizontal as 38 in FIG. 2, vertical as in FIG. 3, or, if desired, both sets of baffles, a horizontal and vertical set, can be employed to direct the water flow. As indicated in FIG. 3, when vertical partitions are used, the partitions should be about 180° apart and about 90° from the absorbent flow path when viewed in cross-section. The vertical partitions preferably extend from about the upper liquid level to near the bottom of the vessel.

The buoyant head developed in the contacting stages is generally adequate to induce the desired flow of sea water through the system. The column is conveniently and preferably erected on the ocean floor and is preferably completely submerged in water to minimize the head requirements for circulating water through the column. It is not essential, however, that the contactor rests on the ocean floor as it can be suspended or supported in the ocean as long as it is submerged. A pump may be installed on the water feed line, however, if desired.

The following example, which refers to both FIGS. 1 and 2, exemplifies the type of conditions used in the process of this invention. The example, however, is not meant to be limiting in any way as the conditions under which the process can run can vary greatly and depend upon where the apparatus is located, the particular absorbent used, and the gaseous mixture to be treated. This particular example is concerned with the preferred embodiment of the invention wherein the apparatus is erected on the ocean floor.

EXAMPLE

Natural gas, 70 percent (volume) $CO_2$ and 30 percent $CH_4$, is produced at a rate of 18,000,000 SCFD (standard cubic feet per day) from well heads 450 feet below mean sea level at a pressure of 3,000 psig and a temperature of 260° F. (127° C.). Sea floor temperature is 60° F. The gas is passed (as shown in FIG. 1) through an expansion valve 2, reducing the pressure to 1,000 psig and 140° F. (60° C.). Expanded gas is reheated in a heat exchanger 4 to about 260° F. (127° C.) and an expansion engine 6 further reduces the pressure to 220 psig and 60° F. The gas is passed into the bottom of a four-stage absorber 21 (as shown in FIG. 2) which is mounted on an ocean floor platform where it is contacted with sea water. The absorber is four feet in diameter and 170 feet tall, each stage 26 consisting of a 10-foot gas collection and redistribution section 33 and a 15- to 30-foot gas-liquid contacting section in the draft tube. Stage efficiency is about 80 percent, and vapor velocity in the draft tube is desirably limited to about five feet per second. The gas passes through the absorber as indicated in FIG. 2. Referring again to FIG. 1, the gas issues 11 from the top of the absorber from which it is recompressed to 3,000 psig and about 600° F. (315° C.) 12, heat exchanged with the expanded feed gas 4 and yielded as product at about 240° F. (116° C.) 13. The compressor is conveniently powered by the expansion engine. The product gas is 5,000,000 SCFD of 95 percent (volume) methane, representing a methane recovery of about 88 percent. Sea water to the absorber is preferably taken from near the floor of the sea where the water is coldest, introduced into the bottom of the top absorber stage at a rate of 11,000 GPM, flows down the column as indicated by the arrows in FIG. 2, issues from the bottom stage and is discharged to the sea at a point well above the floor of the sea.

It is within the scope of the invention to utilize a pump on the incoming sea water to supply a small amount of head in addition to that generated in the column itself. Generally this will not be necessary unless it is desired to discharge the $CO_2$-saturated water at or near the surface or at a distant discharge point.

Certain modifications of the invention will become apparent to those skilled in the art, and the illustrative details enclosed are not to be construed as imposing unnecessary limitations on the invention.

We claim:

1. A method for removing $CO_2$ from a gas comprising natural gas and $CO_2$, said method comprising the steps of:
   obtaining said gas from a wellhead,
   introducing sea water from near the ocean floor into the upper portion of a contacting zone located on the ocean floor wherein said contacting zone contains a plurality of compartments known as absorber stages,
   introducing said gas from said expansion valve into the lower portion of said contacting zone,
   contacting said sea water with the gas in each adsorber stage wherein the gas and sea water flow cocurrently upward through the stage,
   accumulating the gas in the top of the stage and passing it to a dispersing means in the lower portion of the compartment above whereby the gas is dispersed therein, allowing the sea water, which has flowed cocurrently upward to the top of the stage, to flow downwardly via a passage means and enter the lower stage at a point below the dispersing means of said compartment, withdrawing the $CO_2$-enriched sea water from a point near the lower end of said contacting zone, and recovering natural gas from the upper portion of said contacting zone.

2. A method according to claim 1 wherein said contacting zone comprises a tube which is divided into a series of compartments and is located concentrically inside a larger outer shell and said absorbent flows donwardly via a passage means which is an annulus between the tube and outer shell.

3. A method according to claim 1 wherein said contacting zone is submerged in the sea water.

4. A method according to claim 1 wherein the $CO_2$ concentration of the natural gas is 10 volume percent or more.

5. A method according to claim 1 wherein a pump is used to induce the desired flow of sea water through the system.

6. A method according to claim 1 wherein the natural gas is passed from said wellhead to an expansion valve, the expanded gas from said expansion valve is reheated in a heat exchanger, an expansion engine further reduces the pressure of said gas and the gas is then passed to the bottom of said contacting zone.

7. A method in accordance with claim 6 wherein said expansion engine drives a compressor and wherein the natural gas removed from the upper portion of the contacting zone is compressed in said compressor and passed from said compressor to a point of final usage.

8. A method in accordance with claim 7 wherein the compressed gas from said compressor is passed through said heat exchanger into indirect heat exchange with the gas coming from said expansion valve.

9. An apparatus for removing carbon dioxide from natural gas comprising:

conduit means from a gas wellhead to an expansion valve, connecting means from said expansion valve to the bottom of a contacting zone, said contacting zone comprising a tube located inside a larger outer shell which is closed at each end wherein said tube is divided into a series of compartments, a gas-dispersing means located near the bottom of each of compartments, means near the bottom of each compartment for allowing sea water to be introduced into the compartment below the dispersing means, means near the top of each compartment for allowing the sea water to pass out of the compartment, passage means allowing the sea water to flow downwardly to the lower compartment and enter said lower compartment below the dispersing means, conduit means for introducing the sea water into the lower portion of the top compartment, and means for withdrawing the used sea water from the lower portion of the contacting zone and withdrawing the separated gas from the top of the contacting zone.

10. The apparatus of claim 9 wherein said tube is located concentrically inside said larger outer shell and said passage means is the annulus between the tube and outer shell.

11. The apparatus of claim 10 wherein said contacting zone is located on the ocean floor and further comprises means for introducing ocean sea water into the lower portion of the top compartment, means for passing the used absorbent sea water out to sea, and said concentrically located tube is divided into four compartments.

12. The apparatus of claim 9 wherein said connecting means comprises:

conduit means from the expansion valve to a heat exchanger, conduit means from the heat exchanger to an expansion engine, and means for passing the gas from the expansion engine into the bottom of the contacting zone.

13. Apparatus in accordance with claim 12 further comprising compressor means operatively connected to said expansion engine and conduit means connecting the top of the contacting zone with said compressor means for compressing the separated gas, and conduit means connecting the compressor outlet with said heat exchanger such as to put the compressed natural gas into indirect heat exchange relationship with the gas coming from said expansion valve.

* * * * *

UNITED STATES PATENT AND TRADEMARK OFFICE
CERTIFICATE OF CORRECTION

PATENT NO. : 4,235,607
DATED : November 25, 1980
INVENTOR(S) : Richard A. Kinder; Fred T. Sherk It is certified that error appears in the above-identified patent and that said Letters Patent are hereby corrected as shown below:

Column 8, line 60, delete "from said expansion valve".

Column 10, line 5, before "compartments" insert --- said ---.

Signed and Sealed this

Twenty-eighth Day of July 1981

[SEAL]

Attest:

GERALD J. MOSSINGHOFF

Attesting Officer     Commissioner of Patents and Trademarks